R. W. MILLER.
RESILIENT WHEEL.
APPLICATION FILED OCT. 2, 1919.
1,398,880.
Patented Nov. 29, 1921.
4 SHEETS—SHEET 2.
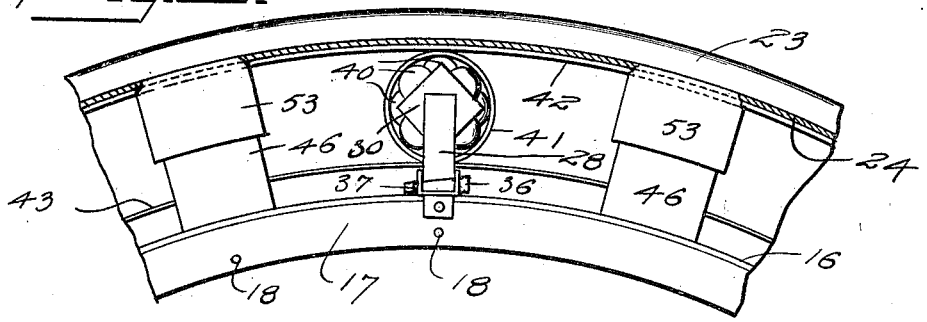
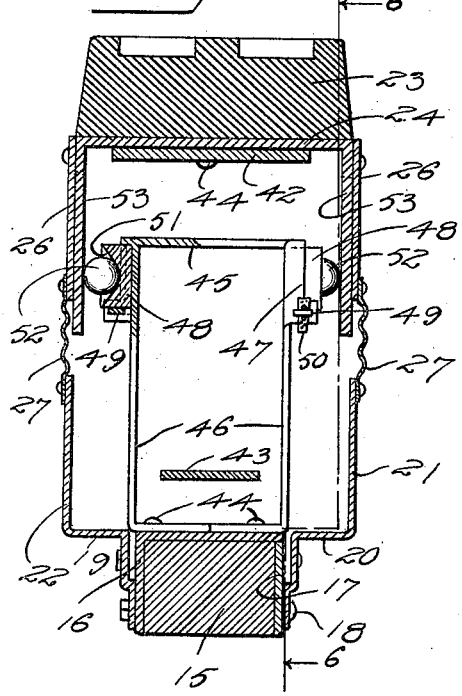
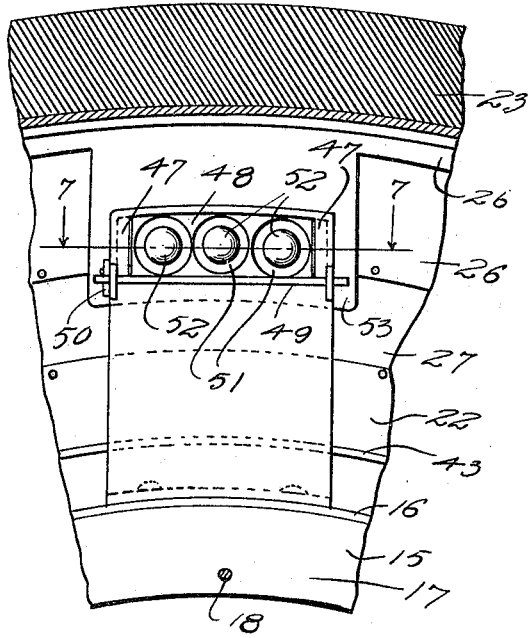
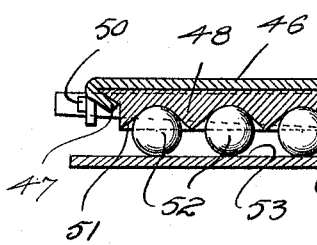

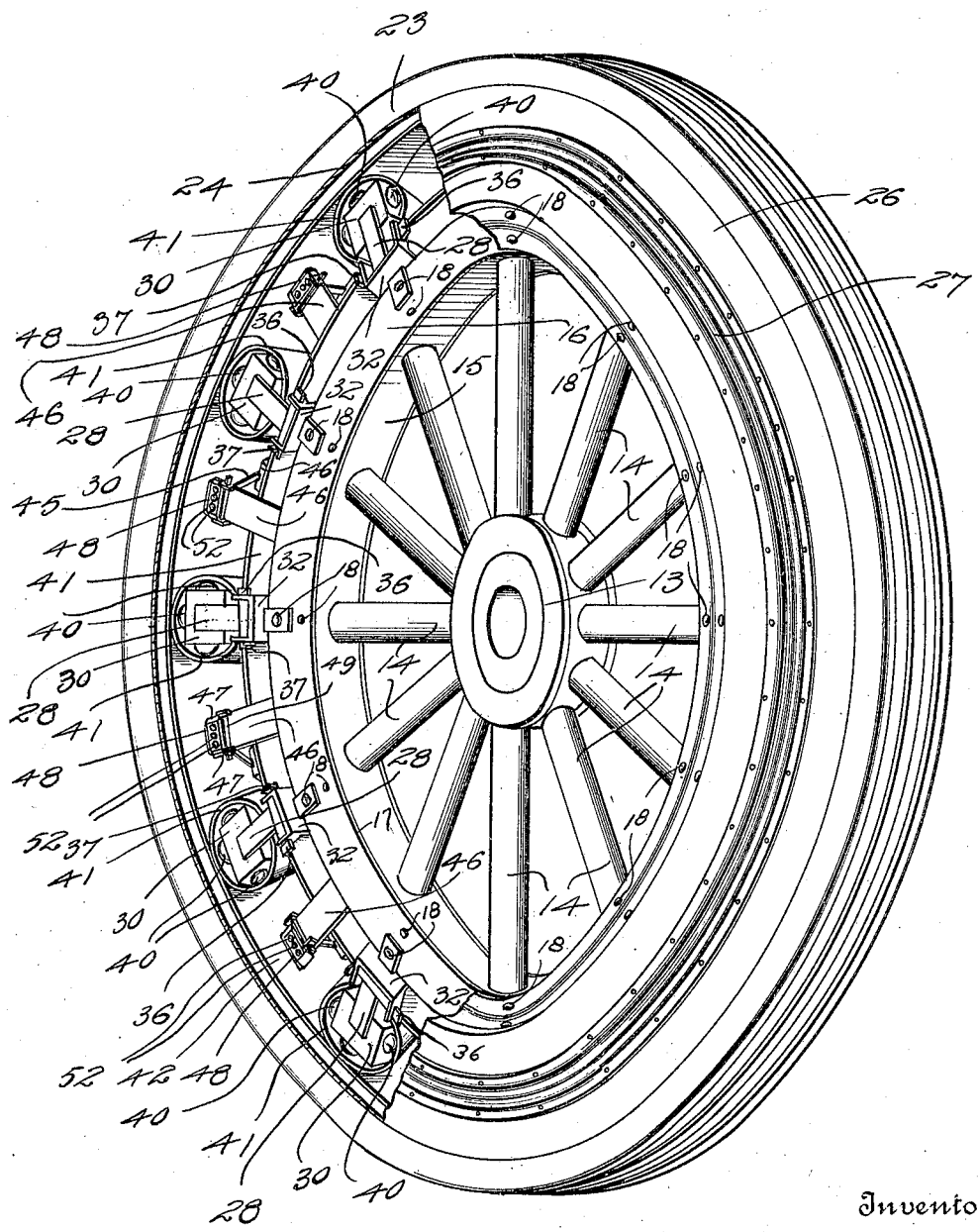

R. W. MILLER.
RESILIENT WHEEL.
APPLICATION FILED OCT. 2, 1919.
1,398,880.
Patented Nov. 29, 1921.
4 SHEETS—SHEET 3.
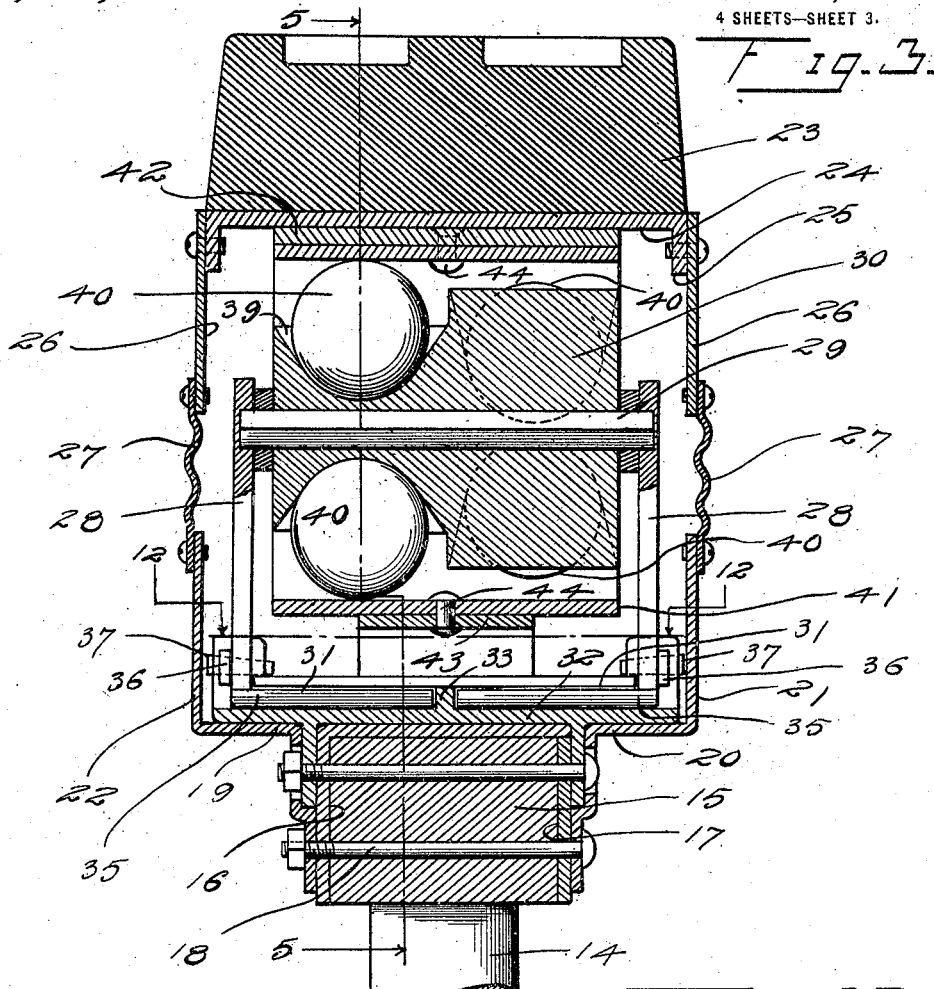

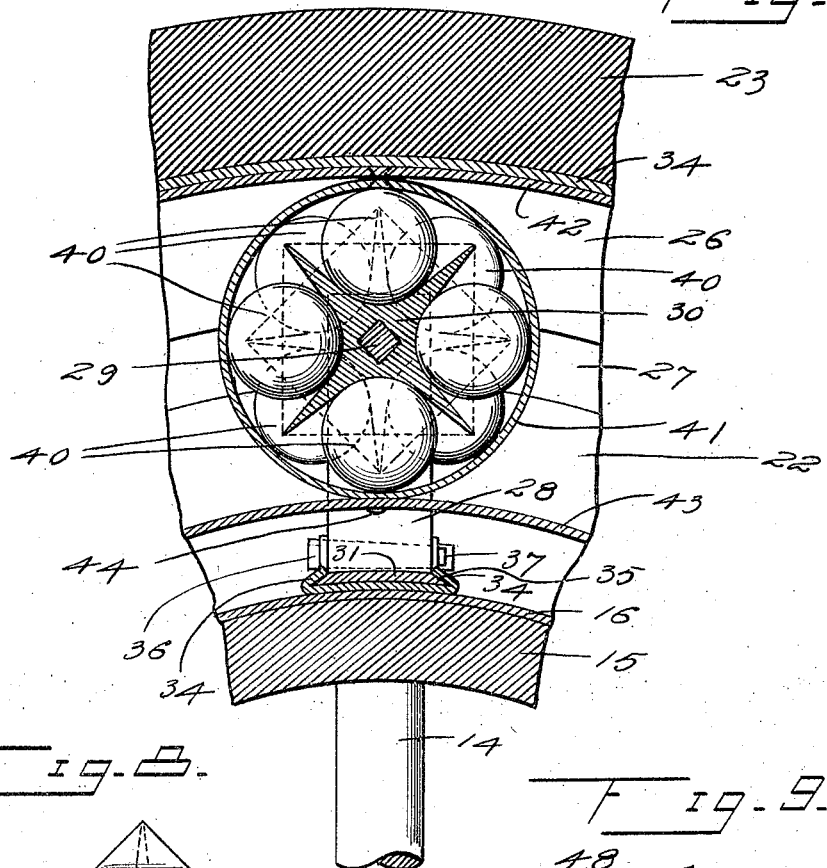
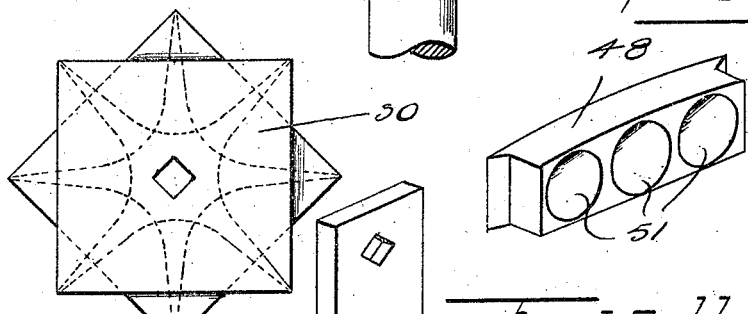
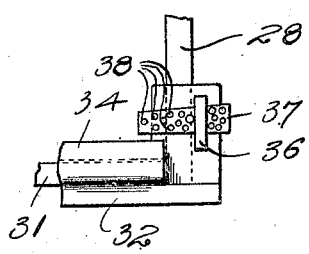
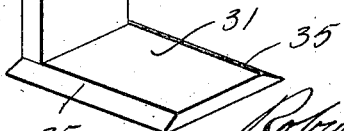

UNITED STATES PATENT OFFICE.

ROBERT W. MILLER, OF WILMINGTON, DELAWARE.

RESILIENT WHEEL.

1,398,880.

Specification of Letters Patent.   Patented Nov. 29, 1921.

Application filed October 2, 1919.   Serial No. 327,868.

*To all whom it may concern:*

Be it known that I, ROBERT W. MILLER, a citizen of the United States, residing at Wilmington, in the county of New Castle and State of Delaware, have invented certain new and useful Improvements in Resilient Wheels; and I do hereby declare the following to be a full, clear, and exact description of the invention, such as will enable others skilled in the art to which it appertains to make and use the same.

The present invention relates to wheels for vehicles and consists in the combinations and arrangements of elements hereinafter described and particularly set forth in the accompanying claims.

The invention has for its purpose to provide a wheel of this type having solid tires and possessing a high degree of resiliency, and which will readily withstand the wear and strain to which such wheels would ordinarily be subjected on vehicles.

The invention has for its further purpose to construct a resilient vehicle wheel wherein the resilient elements are of simple construction, inexpensive to produce, and which may be applied to or removed from position on the wheel in a simple and easily performed manner.

Another object of the invention resides in having a resilient wheel in which the several resilient elements are distributed on the wheel in such a way that there will be uniform wearing and strain on all parts, and in which said elements will be kept at all times in clean and proper working condition.

The invention is disclosed by way of illustration in the accompanying drawings wherein:

Figure 1 is a perspective view, partly in section, of the wheel.

Fig. 2 is a side elevational view of a section of the wheel rim showing one of the resilient devices.

Fig. 3 is a transverse sectional view on an enlarged scale of the wheel rim.

Fig. 4 a similar view showing one of the alining devices.

Fig. 5 a sectional view taken on the lines 5—5 of Fig. 3.

Fig. 6 a sectional view taken on the line 6—6 of Fig. 4.

Fig. 7 a horizontal sectional view taken on the line 7—7 of Fig. 6.

Fig. 8 a detail view, in elevation, of one of the bearing blocks.

Fig. 9 a detail perspective view of one of the ball carrying members of the alining device.

Fig. 10 a detail view of one of the fastening members for an alining device.

Fig. 11 a detail perspective view of one of the supporting members, and

Fig. 12 a horizontal sectional view taken on the line 12—12 of Fig. 3.

Referring to the construction in further detail and wherein like reference characters indicate corresponding parts in the several views, the wheel consists of a rigid portion formed of the usual hub 13, having spokes 14, carrying the felly 15 after the usual manner, and said felly has fitted thereon a metal rim portion (16 and 17) secured by the bolts 18 as shown (see Fig. 3).

A pair of metal rings 19 and 20 are secured to the metal rim portion (16 and 17) by the several bolts 18 and said rings have radially disposed annular portions 21 and 22 forming a circumferential channel-way or space within which the resilient elements of the wheel are located.

The resilient portion of the wheel consists of a floating rim formed of a solid rubber or other tire 23 mounted on the ring 24 and said ring has inturned flanges 25 to which are fastened the two side plates 26. Said plates 26 are connected to the ring portions 21 and 22 of the rigid wheel part by the two fabric strips 27 and therewith provide the annular channel-way containing the resilient and alining devices, and said channel-way is effectively closed to exclude all foreign matter as shown.

The resilient medium for the wheel consists of a plurality of cushion devices uniformly spaced around the wheel between the fixed wheel part and the floating rim, and between each two of said devices there is located an alining device disposed to keep the floating rim in operative position with respect to the rigid part of the wheel.

Each of said resilient elements consists of two brackets or upright arms 28 supporting an axle 29, preferably square in cross-section, and on which is mounted a metal bearing block 30 of that design clearly shown in Figs. 3, 5, and 8. Each bracket arm 28 has a laterally disposed bearing portion 31 that rests upon the metal support 32 and which in turn contacts with the rim portion (19 and 20).

Each metal support 32 has a flange 33, to either side of which the brackets 31 are placed and the means for securing said brackets in position consists of two flanges 34 formed on the ring 32 (see Fig. 10) that receive the beveled edges 35 with a close fit; and a wedge 36 locked by a pin 37 securely holds the bracket in position. The locking pin 37 is provided with a plurality of openings 38 whereby said pin may itself be secured at the proper adjusted position when the device is being set up.

The bearing block 26 is of substantially cylindrical shape and is formed with two sets of semispherical recesses 39 to receive the cushioning balls 40 constructed, preferably of rubber. There are eight of said depressions in all, arranged four on a side and in alternate or off-setting relation after the manner shown in Figs. 3 and 5, whereby to dispose the cushion elements in a manner best conducive to obtaining maximum efficiency from the resilient device as a whole.

The several balls 40 of each resilient device are inclosed within a ring or open cylinder 41 which closely fits said balls and holds the latter firmly seated in their respective pockets, and said cylinder or ring 41 is in turn secured to a ring or band 42 that fits closely against the inner surface of the ring 24 throughout its circumference as shown (see Figs. 3 and 5). A second ring 43 is secured to each of the several rings 41 at their innermost points 44 (see Figs. 3 and 5) and said ring 43 is spaced an appreciable distance beyond the outermost part 32 of the rigid wheel portion. It is understood of course that each of the several resilient elements is constructed in accordance with the details of the device just described.

The several alining devices are disposed alternately with the resilient elements for obvious reasons and each alining device is constructed substantially after the manners shown in Figs. 4, 6, 7, and 9. Said device per se consists of an inverted U-shaped bracket 45 whose side portions 46 are secured to the outermost rim (16 and 17), and said side portions 46 are formed with inturned flanges 47 to receive the bearing blocks 48 (see Fig. 7) and said bearing blocks are rigidly secured by wedge 49 having a tightening key 50. The inner face of said block 48 is recessed to form a series of spherical shaped recesses 51 adapted to receive the several anti-friction ball bearings 52 that contact with the inner side faces of the flanges 53 formed on the side plates 26 of the floating rim (see Fig. 6).

It will therefore be seen from the foregoing that the cushioning element will give the required resiliency for the floating wheel rim and that said rim will at all times work in true alinement with the rigid portion of the wheel; and it will be further noted that the several working parts will properly function under all normal conditions; that the same are inexpensive to produce and that the wheel as a whole may be readily set up or taken down without requiring any special skill.

The invention is not to be understood as being limited to the details of construction herein shown and described, as these may be varied widely without departing from the spirit of the invention.

Having thus described my invention, what I claim as new and desire to secure by Letters Patent is:

1. In a vehicle wheel the combination of a rigid wheel portion, a floating rim portion, and a sustaining medium interposed between said rigid and floating wheel portions comprising clustered and separately mounted elastic balls, substantially as set forth.

2. In a vehicle wheel the combination of a rigid wheel portion, a floating rim portion, resilient and separately mounted sustaining balls assembled in clusters and interposed between said rigid and floating wheel portions, and means for holding said wheel elements and the resilient clustered elements in true annular alinement, substantially as set forth.

3. In a vehicle wheel the combination of a rigid wheel portion, a floating rim portion, a plurality of blocks interposed between said rigid and floating wheel portions, and a plurality of annularly disposed and independent cushioned elements interposed between said blocks and the rigid and floating wheel portion respectively substantially as set forth.

4. In a vehicle wheel the combination of a rigid wheel portion, a floating rim portion, and resilient devices interposed between said wheel and rim portion, each of said devices comprising a block supported by the rigid wheel portion, a ring carried by the floating rim portion, and a plurality of independent and annularly disposed cushioning elements interposed between said block and the ring, substantially as set forth.

5. In a vehicle wheel the combination of a rigid wheel portion, a floating rim portion, and resilient devices interposed between said wheel and rim portions, each of said devices comprising a block supported by the rigid wheel portion and provided with recesses, a ring carried by the floating rim portion, and a plurality of balls of elastic material interposed between said block and the ring, substantially as set forth.

In testimony whereof I affix my signature in the presence of two witnesses.

ROBERT W. MILLER.

Witnesses:
CHAS. E. RIORDON,
CLINTON L. MARSHALL.